(12) United States Patent
Zhao et al.

(10) Patent No.: US 9,408,128 B2
(45) Date of Patent: Aug. 2, 2016

(54) CONTROL METHOD FOR POWER CONFIGURATION ON HETEROGENEOUS NETWORK, AND USER EQUIPMENT

(71) Applicant: Huawei Technologies Co., Ltd., Shenzhen (CN)

(72) Inventors: Yueying Zhao, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/881,008

(22) Filed: Oct. 12, 2015

(65) Prior Publication Data

US 2016/0037419 A1    Feb. 4, 2016

Related U.S. Application Data

(63) Continuation of application No. PCT/CN2013/074141, filed on Apr. 12, 2013.

(51) Int. Cl.
*H04W 36/00* (2009.01)
*H04W 36/18* (2009.01)
(Continued)

(52) U.S. Cl.
CPC .............. *H04W 36/18* (2013.01); *H04W 52/16* (2013.01); *H04W 52/146* (2013.01); *H04W 52/244* (2013.01); *H04W 52/325* (2013.01); *H04W 52/362* (2013.01); *H04W 52/40* (2013.01)

(58) Field of Classification Search
CPC . H04W 52/244; H04W 52/367; H04W 24/04; H04W 72/00; H04W 28/18; H04W 52/146; H04W 52/243; H04W 72/08; H04W 36/18; H04W 52/16; H04W 52/40; H04B 17/309; H04B 17/336; H04B 17/24; H04B 17/327

USPC ................... 445/442; 370/316, 495, 468, 494
See application file for complete search history.

(56) References Cited

U.S. PATENT DOCUMENTS

| 6,334,047 | B1 * | 12/2001 | Andersson ............ H04W 52/04 |
| | | | 455/436 |
| 2002/0111163 | A1 * | 8/2002 | Hamabe .............. H04W 72/082 |
| | | | 455/425 |

(Continued)

FOREIGN PATENT DOCUMENTS

| CN | 1428947 A | 7/2003 |
| CN | 102215533 A | 10/2011 |
| CN | 102761920 A | 10/2012 |

OTHER PUBLICATIONS

"HS-DPCCH performance evaluation in HetNet," 3GPP TSG-RAN WG1 Meeting #72, St. Julian's, Malta, R1-130509, 3rd Generation Partnership Project, Valbonne, France (Jan. 28-Feb. 1, 2013).

(Continued)

*Primary Examiner* — Mahendra Patel
(74) *Attorney, Agent, or Firm* — Leydig, Voit & Mayer, Ltd.

(57) ABSTRACT

The present application provides a control method for power configuration on a heterogeneous network, and a user equipment. The control method for power configuration includes: determining whether the user equipment is in a soft handover area, in which a macro base station is used as a serving base station, between uplink and downlink balance points; when the user equipment is in the soft handover area, in which the macro base station is used as the serving base station, between the uplink and downlink balance points, increasing power of a dedicated physical control channel, so that the serving base station can normally receive a signal from the user equipment; and adjusting a power offset of an enhanced dedicated physical data channel to a first power offset, where the first power offset is any value in a flat area of an optimal power offset of the user equipment.

7 Claims, 3 Drawing Sheets

(51) Int. Cl.
*H04W 52/16* (2009.01)
*H04W 52/14* (2009.01)
*H04W 52/24* (2009.01)
*H04W 52/32* (2009.01)
*H04W 52/36* (2009.01)
*H04W 52/40* (2009.01)

(56) References Cited

U.S. PATENT DOCUMENTS

| | | | |
|---|---|---|---|
| 2007/0280183 A1* | 12/2007 | Cho | H04W 52/04 370/338 |
| 2008/0146154 A1* | 6/2008 | Claussen | H04W 52/244 455/63.1 |
| 2008/0175185 A1* | 7/2008 | Ji | H04W 52/243 370/318 |
| 2008/0200202 A1* | 8/2008 | Montojo | H04W 52/06 455/522 |
| 2009/0270109 A1* | 10/2009 | Wang Helmersson | H04W 28/18 455/453 |
| 2011/0039561 A1* | 2/2011 | Narasimha | H04W 52/146 455/436 |
| 2011/0195708 A1* | 8/2011 | Moberg | H04W 36/0094 455/424 |
| 2011/0195730 A1* | 8/2011 | Chami | H04W 52/244 455/501 |
| 2012/0157152 A1* | 6/2012 | Blomgren | H04W 52/146 455/522 |
| 2012/0182946 A1* | 7/2012 | Chen | H04L 5/0032 370/329 |
| 2013/0029657 A1* | 1/2013 | Gao | H04W 74/004 455/422.1 |
| 2014/0003388 A1* | 1/2014 | Tidestav | H04W 52/40 370/331 |
| 2014/0036786 A1* | 2/2014 | Kazmi | H04W 52/146 370/329 |
| 2014/0064247 A1* | 3/2014 | Teyeb | H04W 36/0083 370/331 |
| 2014/0064248 A1* | 3/2014 | Hultell | H04W 52/241 370/331 |

OTHER PUBLICATIONS

"HS-DPCCH reliability in co-channel interference scenario," 3GPP TSG-RAN WG1 Meeting #72bis, Chicago, Illinois, R1-131483, 3rd Generation Partnership Project, Valbonne, France (Apr. 15-19, 2013).

* cited by examiner

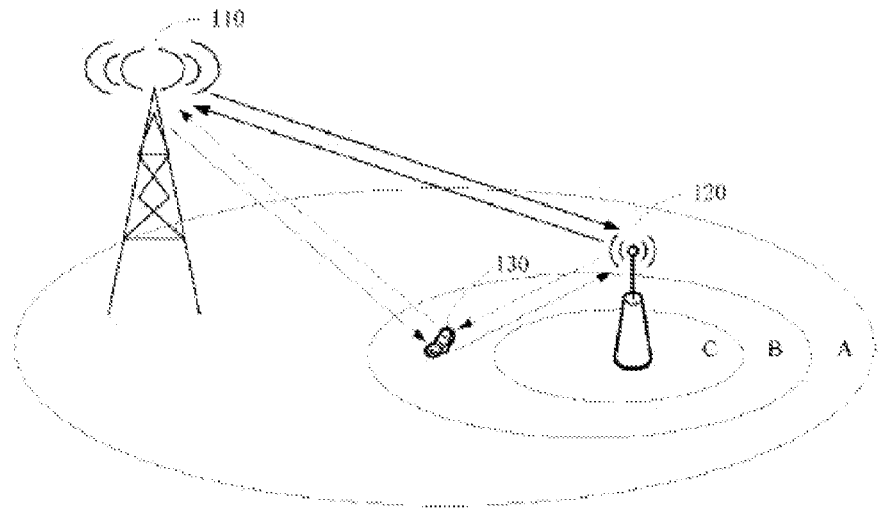

FIG. 1

| A user equipment increases power of a dedicated physical control channel when the user equipment is in a soft handover area, in which a macro base station is used as a serving base station, between uplink and downlink balance points, so that the serving base station can normally receive a signal from the user equipment | — S101 |

| Adjust a power offset of an enhanced dedicated physical data channel to a first power offset, where the first power offset is any value in a flat area of an optimal power offset of a user | — S102 |

FIG. 2

CONTROL METHOD FOR POWER CONFIGURATION ON HETEROGENEOUS NETWORK, AND USER EQUIPMENT

CROSS-REFERENCE TO RELATED APPLICATIONS

This application is a continuation of International Application No. PCT/CN2013/074141, filed Apr. 12, 2013, which is hereby incorporated by reference in its entirety.

TECHNICAL FIELD

The present invention belongs to the field of wireless communications technologies, and in particular, relates to a control method for power configuration on a heterogeneous network, and a user equipment.

BACKGROUND

To improve a processing capability on a network side, the prior art provides a heterogeneous network (Hetnet) technology, that is, a micro base station is disposed within a cell covered by a large-coverage macro base station, and the micro base station is used together with the macro base station to implement networking.

On the foregoing Hetnet in the prior art, there is a soft handover area, and when a user equipment is in the soft handover area, uplink channel power of the user equipment received by the micro base station is greater than uplink channel power of the user equipment received by the macro base station. However, in the soft handover area on the Hetnet, the user equipment is subject to power control by both the micro base station and the macro base station, and a power control criteria is: the user equipment responds by performing a decrease power operation, provided that one base station on the Hetnet sends a "decrease power" instruction; the user equipment responds by performing an increase power operation only when all base stations send an "increase power" instruction to the user equipment. In this case, demodulation performance of an uplink high speed dedicated physical control channel (HS-DPCCH) is directly affected.

According to an existing method, when a user equipment is in a soft handover area, the user equipment increases power of a dedicated physical control channel (DPCCH) to ensure demodulation performance of an HS-DPCCH. However, in this case, power of an enhanced dedicated physical data channel (E-DPDCH) is correspondingly increased, which causes the power of the E-DPDCH to be excessively high and wastes load resources of a Hetnet. In addition, when the user equipment is in the soft handover area, a signal of the user equipment received by a micro base station is very strong, but a signal of the user equipment received by a macro base station is very weak. When the power of the E-DPDCH of the user equipment is increased, a signal of the user equipment received by the micro base station is stronger, which inevitably causes interference to a signal of the user equipment received by the macro base station. When the macro base station sends a decrease power instruction to the user equipment, the user equipment further decreases power in response to the decrease power instruction. As a result, an objective of ensuring demodulation performance of the HS-DPCCH by increasing power of a DPCCH cannot be achieved.

SUMMARY

A technical problem mainly resolved in the present application is to resolve a performance problem of an uplink high speed dedicated physical control channel in a soft handover area on a heterogeneous network.

In view of this, embodiments of the present application provide a control method for power configuration on a heterogeneous network, and a user equipment, so as to implement, when the user equipment is in a soft handover area on the heterogeneous network, normal communication between the user equipment and a base station without affecting performance of an HS-DPCCH.

According to a first aspect of the present application, a control method for power configuration on a heterogeneous network is provided, including the following steps: determining whether a user equipment is in a soft handover area, in which a macro base station is used as a serving base station, between uplink and downlink balance points; increasing power of a dedicated physical control channel when the user equipment is in the soft handover area, in which the macro base station is used as the serving base station, between the uplink and downlink balance points, so that the serving base station can normally receive a signal from the user equipment; and adjusting a power offset of an enhanced dedicated physical data channel to a first power offset, where the first power offset is any value in a flat area of an optimal power offset of the user equipment.

With reference to the first aspect, in a first possible implementation manner, the first power offset meets: $PO_1 = (SIR_0/SIR_1) \times (PO_0 + PO_w) - PO_w$, where $PO_1$ is the first power offset, $SIR_0$ is an initial signal-to-noise ratio target value of the dedicated physical control channel when the user equipment is not in the soft handover area, $PO_0$ is an initial power offset of the enhanced dedicated physical data channel when the user equipment is not in the soft handover area, $SIR_1$ is an adjusted first signal-to-noise ratio target value of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w = PO_{hsdpcch} + PO_{edpcch} + PO_{dpdch} + 1$.

With reference to the first possible implementation manner of the first aspect, in a second possible implementation manner, the step of increasing power of a dedicated physical control channel when the user equipment is in the soft handover area, in which the macro base station is used as the serving base station, between the uplink and downlink balance points includes: when the user equipment is in the soft handover area, in which the macro base station is used as the serving base station, between the uplink and downlink balance points, adjusting a signal-to-noise ratio target value of the dedicated physical control channel from the initial signal-to-noise ratio target value to the first signal-to-noise ratio target value, so that the serving base station can normally receive a signal from the user equipment, where the first signal-to-noise ratio target value is greater than the initial signal-to-noise ratio target value.

With reference to the first aspect, in a third possible implementation manner of the first aspect, the first power offset meets: $PO_1 = (Ec_{dpcch0}/Ec_{dpcch1}) \times (PO_0 + PO_w) - PO_w$, where $PO_1$ is the first power offset, $Ec_{dpcch0}$ is initial transmit power of the dedicated physical control channel when the user equipment is not in the soft handover area, $PO_0$ is an initial power offset of the enhanced dedicated physical data channel when the user equipment is not in the soft handover area, $Ec_{dpcch1}$ is adjusted first transmit power of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

With reference to the first aspect, in a fourth possible implementation manner of the first aspect, the first power offset meets: $PO_1=(1/PO_{dpcch})\times(PO_0+PO_w)-PO_w$, where $PO_1$ is the first power offset, $PO_0$ is an initial power offset of the enhanced dedicated physical data channel when the user equipment is not in the soft handover area, $PO_{dpcch}$ is a power offset of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

With reference to the third or fourth possible implementation manner of the first aspect, in a fifth possible implementation manner of the first aspect, the step of increasing power of a dedicated physical control channel when the user equipment is in the soft handover area, in which the macro base station is used as the serving base station, between the uplink and downlink balance points includes: when the user equipment is in the soft handover area, in which the macro base station is used as the serving base station, between the uplink and downlink balance points, adjusting transmit power of the dedicated physical control channel from the initial transmit power to the first transmit power, so that the serving base station can normally receive a signal from the user equipment, where the first transmit power is greater than the initial transmit power.

According to a second aspect, a user equipment is provided, where the user equipment includes a determining module and a control module, where the determining module is configured to: determine whether the user equipment is in a soft handover area, in which a macro base station is used as a serving base station, between uplink and downlink balance points; and output a determining result to the control module; and the control module is configured to: when the user equipment is in the soft handover area, in which the macro base station is used as the serving base station, between the uplink and downlink balance points, increase power of a dedicated physical control channel, so that the serving base station can normally receive a signal from the user equipment; and adjust a power offset of an enhanced dedicated physical data channel to a first power offset, where the first power offset is any value in a flat area of an optimal power offset of the user equipment.

With reference to the second aspect, in a first possible implementation manner of the second aspect, the first power offset meets: $PO_1=(SIR_0/SIR_1)\times(PO_0+PO_w)-PO_w$, where $PO_1$ is the first power offset, $SIR_0$ is an initial signal-to-noise ratio target value of the dedicated physical control channel when the user equipment is not in the soft handover area, $PO_0$ is an initial power offset of the enhanced dedicated physical data channel when the user equipment is not in the soft handover area, $SIR_1$ is an adjusted first signal-to-noise ratio target value of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$; and the control module is configured to: when the user equipment is in the soft handover area, in which the macro base station is used as the serving base station, between the uplink and downlink balance points, adjust a signal-to-noise ratio target value of the dedicated physical control channel from the initial signal-to-noise ratio target value to the first signal-to-noise ratio target value, so that the serving base station can normally receive a signal from the user equipment, where the first signal-to-noise ratio target value is greater than the initial signal-to-noise ratio target value.

With reference to the second aspect, in a second possible implementation manner of the second aspect, the first power offset meets: $PO_1=(Ec_{dpcch0}/Ec_{dpcch1})\times(PO_0+PO_w)-PO_w$, where $PO_1$ is the first power offset, $Ec_{dpcch0}$ is initial transmit power of the dedicated physical control channel when the user equipment is not in the soft handover area, $PO_0$ is an initial power offset of the enhanced dedicated physical data channel when the user equipment is not in the soft handover area, $Ec_{dpcch1}$ is adjusted first transmit power of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$; or the first power offset meets: $PO_1=(1/PO_{dpcch})\times(PO_0+PO_w)-PO_w$, where $PO_1$ is the first power offset, $PO_0$ is an initial power offset of the enhanced dedicated physical data channel when the user equipment is not in the soft handover area, $PO_{dpcch}$ is a power offset of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_wPO_{hsdpcch}+PO_{edpcch}+PO_{dpdch}+1$; and the control module is configured to: when the user equipment is in the soft handover area, in which the macro base station is used as the serving base station, between the uplink and downlink balance points, adjust transmit power of the dedicated physical control channel from the initial transmit power to the first transmit power, so that the serving base station can normally receive a signal from the user equipment, where the first transmit power is greater than the initial transmit power.

According to a third aspect, a user equipment is provided, including a processor, a transmitter, and a receiver, where the processor is separately connected to the transmitter and the receiver electrically; the processor is configured to: when the user equipment is in a soft handover area, in which a macro base station is used as a serving base station, between uplink and downlink balance points, increase power of a dedicated physical control channel, so that the serving base station can normally receive a signal from the user equipment; and adjust a power offset of an enhanced dedicated physical data channel to a first power offset, where the first power offset is any value in a flat area of an optimal power offset of the user equipment; the transmitter is configured to send a communication signal to a base station; and the receiver is configured to receive a communication signal from the base station.

According to the foregoing technical solutions, on a heterogeneous network, when a user equipment is in a soft handover area, power of a dedicated physical control channel is increased, so that a serving base station can normally receive a signal from the user equipment; in addition, a power offset of an enhanced dedicated physical data channel is adjusted to a first power offset, where the first power offset is any value in a flat area of an optimal power offset of the user equipment. In this way, when the user equipment is in the soft handover area, power can be quickly adjusted to adapt to a signal transmission requirement, and it can be ensured that demodulation performance of an HS-DPCCH is not affected.

BRIEF DESCRIPTION OF DRAWINGS

FIG. 1 is a schematic diagram of a system architecture of an embodiment of a control method for power configuration according to the present application;

FIG. 2 is a flowchart of an embodiment of a control method for power configuration on a heterogeneous network according to the present application;

DESCRIPTION OF EMBODIMENTS

Figure 3:
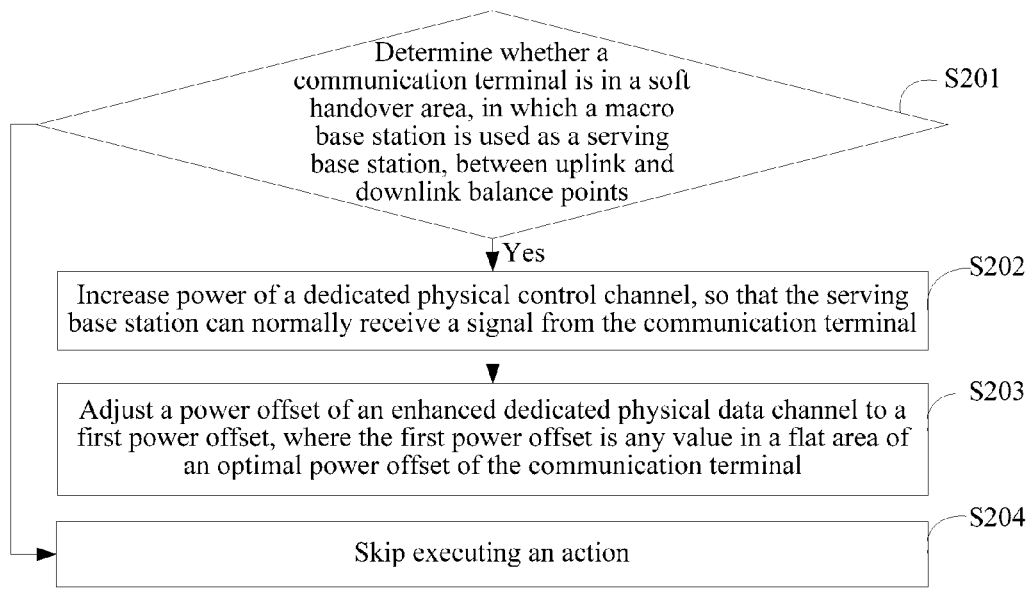
FIG. 3 is a flowchart of another embodiment of a control method for power configuration on a heterogeneous network according to the present application.

In the following description, to illustrate rather than limit, specific details such as a particular system structure, an interface, and a technology are provided to make a thorough understanding of the present application. However, a person skilled in the art should understand that the present application may also be implemented in other embodiments without these specific details. In other cases, detailed descriptions of well-known apparatuses, circuits and methods are omitted, so that the present application is described without being disturbed by the unnecessary details.

Referring to FIG. 1, FIG. 1 is a schematic diagram of an embodiment of a system (namely, a networking system of a heterogeneous network) for implementing a control method for power configuration according to the present application. The networking system of the heterogeneous network in this embodiment includes: a serving base station 110, an auxiliary base station 120, and a user equipment 130. The user equipment 130 may separately establish a radio connection to the serving base station 110 and the auxiliary base station 120, and data transmission may also be performed between the serving base station 110 and the auxiliary base station 120. In this embodiment, a macro base station is used as the serving base station 110, and a micro base station is used as the auxiliary base station 120.

Generally, each user equipment 130 within a cell covered by the serving base station 110 may communicate with the serving base station 110, and each user equipment 130 within a cell covered by the auxiliary base station 120 may communicate with the auxiliary base station 120. However, because the serving base station 110 and the auxiliary base station 120 form a heterogeneous network herein, three areas are formed between the cell covered by the serving base station 110 and the cell covered by the auxiliary base station 120. In area A, a signal of the user equipment 130 received by the serving base station 110 is very strong, and a signal of the serving base station 110 received by the user equipment 130 is also very strong; a signal of the user equipment 130 received by the auxiliary base station 120 is very weak, and a signal of the auxiliary base station 120 received by the user equipment 130 is also very weak. In area B, a signal of the user equipment 130 received by the serving base station 110 is very weak (shown in a dotted line in FIG. 1), and a signal of the serving base station 110 received by the user equipment 130 is very strong (shown in a solid line in FIG. 1); a signal of the user equipment 130 received by the auxiliary base station 120 is very strong (shown in a solid line in FIG. 1), and a signal of the auxiliary base station 120 received by the user equipment 130 is very weak (shown in a dotted line in FIG. 1). In area C, a signal of the user equipment 130 received by the serving base station 110 is very weak, and a signal of the serving base station 110 received by the user equipment 130 is also very weak; a signal of the user equipment 130 received by the auxiliary base station 120 is very strong, and a signal of the auxiliary base station 120 received by the user equipment 130 is also very strong. Therefore, area A and area C are referred to as balance areas, and area B is referred to as a soft handover area, namely an imbalance area.

In this embodiment, the serving base station 110 and the auxiliary base station 120 may communicate directly; in another embodiment, the serving base station 110 and the auxiliary base station 120 may communicate through a radio network controller (RNC, Radio Network Controller).

When the user equipment 130 is in the soft handover area, the user equipment 130 is subject to power control by both the micro base station and the macro base station, and a power control criteria is: the user equipment 130 responds with a decrease power operation, provided that a cell in an active set sends a "decrease power" instruction; the user equipment 130 responds with an increase power operation only when all cells send an "increase power" instruction to the user equipment. In this case, demodulation performance of an uplink high speed dedicated physical control channel (HS-DPCCH) is directly affected.

In view of this, the present application provides a control method for power configuration on a heterogeneous network, so as to implement, when a user equipment is in a soft handover area of the heterogeneous network, normal communication between the user equipment and a base station without affecting demodulation performance of an uplink dedicated physical control channel.

Referring to FIG. 2, FIG. 2 is a flowchart of an embodiment of a control method for power configuration on a heterogeneous network according to the present application. The control method for power configuration on a heterogeneous network in this embodiment includes:

Step S101: A user equipment increases power of a dedicated physical control channel when the user equipment is in a soft handover area, in which a macro base station is used as a serving base station, between uplink and downlink balance points, so that the serving base station can normally receive a signal from the user equipment.

When the user equipment is in the soft handover area, in which the macro base station is used as the serving base station, between the uplink and downlink balance points, the power of the dedicated physical control channel (DPCCH) is increased, so that the serving base station can normally receive the signal from the user equipment.

Step S102: Adjust a power offset of an enhanced dedicated physical data channel to a first power offset, where the first power offset is any value in a flat area of an optimal power offset of the user equipment.

After the power of the DPCCH is increased, the power offset of the enhanced dedicated physical data channel (E-DPDCH) needs to be adjusted in a timely manner; otherwise, an objective of ensuring performance of the DPCCH by increasing the DPCCH cannot be really achieved. Because the power offset of the E-DPDCH correspondingly increases with the power increase of the DPCCH, power of the E-DPDCH exceeds a normal requirement. Due to outer loop adjustment and control, the power is controlled to be decreased, so that the user equipment further responds to a decrease power instruction to decrease transmit power of the user equipment again.

Therefore, after the power of the DPCCH is increased, the power offset of the E-DPDCH is adjusted to the first power offset in a timely manner, where the first power offset is any value in a flat area of an optimal power offset of the user equipment. If the power offset of the E-DPDCH is controlled to the flat area of the optimal power offset of the user equipment, total receive power of the user equipment remains unchanged. In this way, an objective of implementing normal communication by increasing the power of the DPCCH is achieved, and demodulation performance of the DPCCH is not affected.

Based on descriptions of the foregoing embodiment, it may be understood that, according to the control method for power configuration on a heterogeneous network in the embodiment of the present application, when a user equipment is in a soft handover area of the heterogeneous network, power of a dedicated physical control channel is increased, so that a serving base station can normally receive a signal from the user equipment; in addition, a power offset of an enhanced dedicated physical data channel is adjusted to a first power offset, where the first power offset is any value in a flat area of an optimal power offset of the user equipment. In this way, when the user equipment is in the soft handover area, power can be quickly adjusted to adapt to a signal transmission requirement, and it can be ensured that demodulation performance of an HS-DPCCH is not affected.

To further elaborate the technical solution in the present application, the following uses a more detailed implementation process to elaborate the control method for power configuration on a heterogeneous network in the present application.

Referring to FIG. 3, FIG. 3 is a flowchart of an embodiment of a control method for power configuration on a heterogeneous network according to the present application. The control method for power configuration on a heterogeneous network includes:

Step S201: Determine whether a user equipment is in a soft handover area, in which a macro base station is used as a serving base station, between uplink and downlink balance points.

The user equipment determines whether the user equipment is in the soft handover area, in which the macro base station is used as the serving base station, between the uplink and downlink balance points. For example, the user equipment may determine, according to a status of a signal received by the user equipment, whether a location of the user equipment is in the soft handover area. When the user equipment detects that the location of the user equipment has been in the soft handover area, in which the macro base station is used as the serving base station, between the uplink and downlink balance points, step S202 is executed; otherwise, step S204 is executed.

Step S202: Increase power of a dedicated physical control channel, so that the serving base station can normally receive a signal from the user equipment.

When the user equipment is in the soft handover area, in which the macro base station is used as the serving base station, between the uplink and downlink balance points, the power of the DPCCH is increased, so that the serving base station can normally receive the signal from the user equipment.

In actual application, there may be two implementation manners of increasing the power of the DPCCH in the embodiment of the present application. One implementation manner is adjusting a signal-to-noise ratio target value (SIR target) of the DPCCH from an initial signal-to-noise ratio target value ($SIR_0$) to a first signal-to-noise ratio target value ($SIR_1$), so that the serving base station can normally receive a signal from the user equipment, where $SIR_1$ is greater than $SIR_0$, that is, SIR target is increased by means of adjustment.

The other implementation manner is adjusting transmit power of the DPCCH from initial transmit power ($Ec_{dpcch0}$) to first transmit power ($Ec_{dpcch1}$), so that the serving base station can normally receive a signal from the user equipment, where $Ec_{dpcch1}$ is greater than $Ec_{dpcch0}$, that is, the transmit power is increased by means of adjustment.

Step S203: Adjust a power offset of an enhanced dedicated physical data channel to a first power offset, where the first power offset is any value in a flat area of an optimal power offset of the user equipment.

After the power of the DPCCH is increased, the power offset of the E-DPDCH is adjusted to the first power offset in a timely manner. With respect to the two implementation manners of increasing the power of the DPCCH: increasing the power of the DPCCH by adjusting the SIR target and by adjusting the transmit power, there may be the following corresponding implementation manners of adjusting the power offset of the E-DPDCH to the first power offset:

When the power of the DPCCH is increased by adjusting the SIR target, the first power offset may be controlled to meet: $PO_1 = (SIR_0/SIR_1) \times (PO_0 + PO_w) - PO_w$, where $PO_1$ is the first power offset, $SIR_0$ is an initial signal-to-noise ratio target value of the dedicated physical control channel when the user equipment is not in the soft handover area, $PO_0$ is an initial power offset of the enhanced dedicated physical data channel when the user equipment is not in the soft handover area, $SIR_1$ is an adjusted first signal-to-noise ratio target value of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w = PO_{hsdpcch} + PO_{edpcch} + PO_{dpdch} + 1$.

Total receive power in the flat area remain unchanged, that is, $E_0 = E_1$, where $$E_0/N_0 = (SIR_0/256) \times (PO_0 + PO_{hsdpcch} + PO_{edpcch} + PO_{dpdch} + 1), \text{ and}$$

$$E_1/N_0 = (SIR_1/256) \times (PO_1 + PO_{hsdpcch} + PO_{edpcch} + PO_{dpdch} + 1);$$

therefore, $PO_1=(SIR_0/SIR_1)\times(PO_0+PO_{hsdpcch}+PO_{edpcch}+PO_{dpdch}+1)-(PO_{hsdpcch}+PO_{edpcch}+PO_{dpdch}+1)$, and if $PO_m-PO_n$ is the flat area of the optimal power offset of the user equipment, $PO_m \le PO_1 \le PO_n$.

When the power of the DPCCH is increased by adjusting the transmit power, the first power offset may be controlled to meet: $PO_1=(Ec_{dpcch0}/Ec_{dpcch1})\times(PO_0+PO_w)-PO_w$, where $PO_1$ is the first power offset, $Ec_{dpcch0}$ is initial transmit power of the dedicated physical control channel when the user equipment is not in the soft handover area, $PO_0$ is an initial power offset of the enhanced dedicated physical data channel when the user equipment is not in the soft handover area, $Ec_{dpcch1}$ is adjusted first transmit power of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

Total receive power in the flat area remains unchanged, that is, $E_0=E_1$, where $E_0=Ec_{dpcch0}\times(PO_0+PO_{hsdpcch}+PO_{edpcch}+PO_{dpdch}+1),$
and $E_1=Ec_{dpcch1}\times(PO_1+PO_{hsdpcch}+PO_{edpcch}+PO_{dpdch}+1);$ therefore, $PO_1=(Ec_{dpcch0}/Ec_{dpcch1})\times(PO_0+PO_{hsdpcch}+PO_{edpcch}+PO_{dpd}+1)-(PO_{hsdpcch}+PO_{edpcch}+PO_{dpdch}+1)$, and if $PO_m-PO_n$ is the flat area of the optimal power offset of the user equipment, $PO_m \le PO_1 \le PO_n$.

If power adjustment is notified to a user equipment through signaling, the first power offset may be controlled to meet: $PO_1=(1/PO_{dpcch})\times(PO_0+PO_w)-PO_w$, where $PO_1$ is the first power offset, $PO_0$ is an initial power offset of the enhanced dedicated physical data channel when the user equipment is not in the soft handover area, $PO_{dpcch}$ is a power offset of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

Total receive power in the flat area remains unchanged, that is, $E_0=E_1$, where $E_0=Ec_{dpcch0}\times(PO_0+PO_{hsdpcch}+PO_{edpcch}+PO_{dpdch}+1),$
and $E_1=Ec_{dpcch0}\times PO_{dpcch}\times(PO_1+PO_{hsdpcch}+PO_{edpcch}+PO_{dpdch}+1);$ therefore, $PO_1=(1/PO_{dpcch})\times(PO_0+PO_{hsdpcch}+PO_{edpcch}+PO_{dpdch}+1)-(PO_{hsdpcch}+PO_{edpcch}+PO_{dpdch}+1)$, and if $PO_m-PO_n$ is the flat area of the optimal power offset of the user equipment, $PO_m \le PO_1 \le PO_n$.

Step S204: Skip executing an action.

When the user equipment detects that the location of the user equipment is not in the soft handover area, in which the macro base station is used as the serving base station, between the uplink and downlink balance points, no action is executed.

Figure 4:
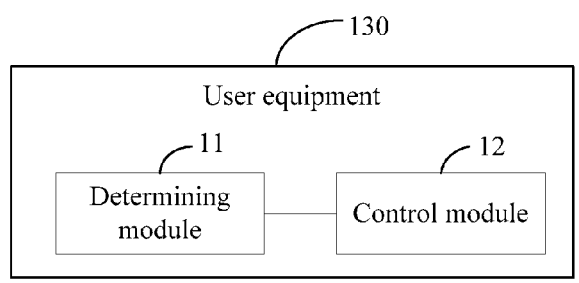
FIG. 4 is a schematic structural diagram of an embodiment of a user equipment in the present application.

Referring to FIG. 4, FIG. 4 is a schematic structural diagram of an embodiment of a user equipment according to the present application. The user equipment 130 includes a determining module 11 and a control module 12.

The determining module 11 is configured to: determine whether the user equipment is in a soft handover area, in which a macro base station is used as a serving base station, between uplink and downlink balance points; and output a determining result to the control module 12.

The determining module 11 determines whether the user equipment is in the soft handover area, in which the macro base station is used as the serving base station, between the uplink and downlink balance points, for example, the determining module 11 may determine, according to a status of a signal received by the user equipment, whether a location of the user equipment is in the soft handover area; and outputs a determining result to the control module 12.

The control module 12 is configured to: when the user equipment is in the soft handover area, in which the macro base station is used as the serving base station, between the uplink and downlink balance points, increase power of a DPCCH, so that the serving base station can normally receive a signal from the user equipment; and adjust a power offset of an E-DPDCH to a first power offset, where the first power offset is any value in a flat area of an optimal power offset of the user equipment.

When the user equipment is in the soft handover area, in which the macro base station is used as the serving base station, between the uplink and downlink balance points, the control module 12 increases the power of the DPCCH, so that the serving base station can normally receive the signal from the user equipment.

In actual application, there may be two implementation manners of increasing, by the control module 12, the power of the DPCCH in the embodiment of the present application. One implementation manner is adjusting a signal-to-noise ratio target value (SIR target) of the DPCCH from an initial signal-to-noise ratio target value ($SIR_0$) to a first signal-to-noise ratio target value ($SIR_1$), so that the serving base station can normally receive a signal from the user equipment, where $SIR_1$ is greater than $SIR_0$, that is, SIR target is increased by means of adjustment.

The other implementation manner is adjusting, by the control module 12, transmit power of the DPCCH from initial transmit power ($Ec_{dpcch0}$) to first transmit power ($Ec_{dpcch1}$), so that the serving base station can normally receive a signal from the user equipment, where $Ec_{dpcch1}$ is greater than $Ec_{dpcch0}$ that is, the transmit power is increased by means of adjustment.

In addition, after the power of the DPCCH is increased, the control module 12 further needs to adjust the power offset of the enhanced dedicated physical data channel (E-DPDCH) in a timely manner; otherwise, an objective of ensuring performance of the DPCCH by increasing the DPCCH cannot be really achieved. Because a power offset of the E-DPDCH correspondingly increases with the power increase of the DPCCH, power of the E-DPDCH becomes excessively high. Due to outer loop adjustment and control, the power is controlled to be decreased, so that the user equipment further responds to a decrease power instruction to decrease transmit power of the user equipment again.

Therefore, after the power of the DPCCH is increased, the control module 12 adjusts the power offset of the E-DPDCH to the first power offset in a timely manner, where the first power offset is any value in a flat area of an optimal power offset of the user equipment. If the power offset of the E-DPDCH is controlled to the flat area of the optimal power offset of the user equipment, total receive power of the user equipment remains unchanged. In this way, an objective of implementing normal communication by increasing the power of the DPCCH is achieved, and demodulation performance of the DPCCH is not affected.

With respect to the two implementation manners of increasing the power of the DPCCH, when the power of the DPCCH is increased by adjusting the SIR target, the control module 12 may control the first power offset to meet: $PO_1=(SIR_0/SIR_1)\times(PO_0+PO_w)-PO_w$, where $PO_1$ is the first power offset, $SIR_0$ is an initial signal-to-noise ratio target value of the dedicated physical control channel when the user equipment is not in the soft handover area, $PO_0$ is an initial power offset of the enhanced dedicated physical data channel when the user equipment is not in the soft handover area, $SIR_1$ is an adjusted first signal-to-noise ratio target value of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

Total receive power in the flat area remains unchanged, that is, $E_0=E_1$, where $$E_0/N_0=(SIR_0/256)\times(PO_0+PO_{hsdpcch}+PO_{edpcch}+PO_{dpdch}+1), \text{ and}$$

$$E_1/N_0=(SIR_1/256)\times(PO_1+PO_{hsdpcch}+PO_{edpcch}+PO_{dpdch}+1);$$

therefore, $PO_1=(SIR_0/SIR_1)\times(PO_0+PO_{hsdpcch}+PO_{edpcch}+PO_{dpdch}+1)-(PO_{hsdpcch}+PO_{edpcch}+PO_{dpdch}+1)$, and if $PO_m-PO_n$ is the flat area of the optimal power offset of the user equipment, $PO_m \leq PO_1 \leq PO_n$.

When the power of the DPCCH is increased by adjusting the transmit power, the control module 12 may control the first power offset to meet: $PO_1=(Ec_{dpcch0}/Ec_{dpcch1})\times(PO_0+PO_w)-PO_w$, where $PO_1$ is the first power offset, $Ec_{dpcch0}$ is initial transmit power of the dedicated physical control channel when the user equipment is not in the soft handover area, $PO_0$ is an initial power offset of the enhanced dedicated physical data channel when the user equipment is not in the soft handover area, $Ec_{dpcch1}$ is adjusted first transmit power of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

Total receive power in the flat area remains unchanged, that is, $E_0=E_1$, where $$E_0=Ec_{dpcch0}\times(PO_0+PO_{hsdpcch}+PO_{edpcch}+PO_{dpdch}+1), \text{ and}$$

$$E_1=Ec_{dpcch1}\times(PO_1+PO_{hsdpcch}+PO_{edpcch}+PO_{dpdch}+1);$$

therefore,
$PO_1(Ec_{dpcch0}/Ec_{dpcch1})\times(PO_0+PO_{hsdpcch}+PO_{edpcch}+PO_{dpdch}+1)-(PO_{hsdpcch}+PO_{edpcch}+PO_{dpdch}+1)$, and if $PO_m-PO_n$ is the flat area of the optimal power offset of the user equipment, $PO_m \leq PO_1 \leq PO_n$.

If power adjustment is notified to a user equipment through signaling, the control module 12 may control the first power offset to meet: $PO_1=(1/PO_{dpcch})\times(PO_0+PO_w)-PO_w$, where $PO_1$ is the first power offset, $PO_0$ is an initial power offset of the enhanced dedicated physical data channel when the user equipment is not in the soft handover area, $PO_{dpcch}$ is a power offset of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

Total receive power in the flat area remains unchanged, that is, $E_0=E_1$, where $$E_0=Ec_{dpcch0}\times(PO_0+PO_{hsdpcch}+PO_{edpcch}+PO_{dpdch}+1), \text{ and}$$

$$E_1=Ec_{dpcch0}\times PO_{dpcch}\times(PO_1+PO_{hsdpcch}+PO_{edpcch}+PO_{dpdch}+1);$$

therefore,
$PO_1=(1/PO_{dpcch})\times(PO_0+PO_{hsdpcch}+PO_{edpcch}+PO_{dpdch}+1)-(PO_{hsdpcch}+PO_{edpcch}+PO_{dpdch}+1)$, and if $PO_m-PO_n$ is the flat area of the optimal power offset of the user equipment, $PO_m \leq PO_1 \leq PO_n$.

Figure 5:
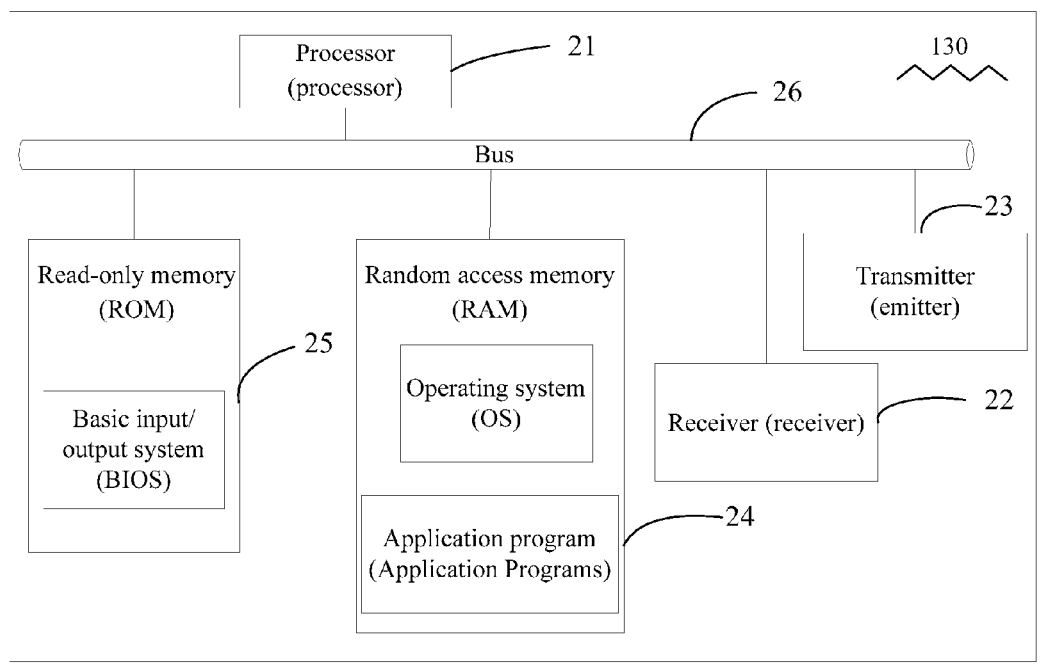
FIG. 5 is a schematic structural diagram of another embodiment of a user equipment in the present application.

Referring to FIG. 5, FIG. 5 is a schematic structural diagram of another embodiment of a user equipment according to the present application. The user equipment 130 includes a processor 21, a receiver 22, a transmitter 23, a random access memory 24, a read-only memory 25, and a bus 26. The processor 21 is separately coupled with the receiver 22, the transmitter 23, the random access memory 24, and the read-only memory 25 through the bus 26. When the user equipment 130 needs to be started, startup is performed by a basic input/output system built in the read-only memory 25 or a bootloader booting system in an embedded system, so as to boot the user equipment 130 to enter a normal running state. After entering the normal running state, the user equipment 130 runs an application program and an operating system on the random access memory 24 and implements that:

the processor 21 is configured to: when a user equipment is in a soft handover area, in which a macro base station is used as a serving base station, between uplink and downlink balance points, increase power of a DPCCH, so that the serving base station can normally receive a signal from the user equipment; and adjust a power offset of an E-DPDCH to a first power offset, where the first power offset is any value in a flat area of an optimal power offset of the user equipment.

The first power offset meets: $PO_1=(SIR_0/SIR_1)\times(PO_0+PO_w)-PO_w$, where $PO_1$ is the first power offset, $SIR_0$ is an initial signal-to-noise ratio target value of a dedicated physical control channel when the user equipment is not in the soft handover area, $PO_0$ is an initial power offset of an enhanced dedicated physical data channel when the user equipment is not in the soft handover area, $SIR_1$ is an adjusted first signal-to-noise ratio target value of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w PO_{hsdpcch}+PO_{edpcch}+PO_{dpdch}+1$.

Alternatively, the first power offset meets: $PO_1=(Ec_{dpcch0}/Ec_{dpcch1})\times(PO_0+PO_w)-PO_w$, where $PO_1$ is the first power offset, $Ec_{dpcch0}$ is initial transmit power of a dedicated physical control channel when the user equipment is not in the soft handover area, $PO_0$ is an initial power offset of an enhanced dedicated physical data channel when the user equipment is not in the soft handover area, $Ec_{dpcch1}$ is adjusted first transmit power of the dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

Alternatively, the first power offset meets: $PO_1=(1/PO_{dpcch})\times(PO_0+PO_w)-PO_w$, where $PO_1$ is the first power offset, $PO_0$ is an initial power offset of an enhanced dedicated physical data channel when the user equipment is not in the soft handover area, $PO_{dpcch}$ is a power offset of a dedicated physical control channel when the user equipment is in the soft handover area, and $PO_w$ is the sum of a power offset $PO_{hsdpcch}$ of a high speed dedicated physical control channel, a power offset $PO_{edpcch}$ of an enhanced dedicated physical control channel, a power offset $PO_{dpdch}$ of a dedicated physical data channel, and a power offset, namely 1, of the dedicated physical control channel when the user equipment is not in the soft handover area, that is, $PO_w=PO_{hsdpcch}+PO_{edpcch}+PO_{dpdch}+1$.

The processor 21 in the embodiment of the present application may be a central processor CPU, or may be a application-specific integrated circuit (ASIC), or may be one or more integrated circuits configured to implement the embodiment of the present application.

The transmitter 23 is configured to send a communication signal to a base station.

The transmitter 23 is configured to send the communication signal to the base station in a process of communication between the user equipment and the base station.

The receiver 22 is configured to receive the communication signal from the base station.

The receiver 22 is configured to receive the communication signal from the base station in the process of the communication between the user equipment and the base station.

Based on the foregoing user equipment, the present application further provides a heterogeneous network system, including a serving base station, an auxiliary base station, and the user equipment, where the user equipment may perform uplink communication with the auxiliary base station, the auxiliary base station and the serving base station may communicate with each other, and the serving base station may perform downlink communication with the user equipment. For details, refer to FIG. 1 and related descriptions, and details are not repeatedly described herein.

Based on descriptions of the foregoing embodiment, it may be understood that, according to the control method for power configuration on a heterogeneous network in the embodiment of the present application, when a user equipment is in a soft handover area of the heterogeneous network, power of a dedicated physical control channel is increased, so that a serving base station can normally receive a signal from the user equipment; in addition, a power offset of an enhanced dedicated physical data channel is adjusted to a first power offset, where the first power offset is any value in a flat area of an optimal power offset of the user equipment. In this way, when the user equipment is in the soft handover area, power can be quickly adjusted to adapt to a signal transmission requirement, and it can be ensured that demodulation performance of an HS-DPCCH is not affected.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present application, and are not intended to limit the scope of the present application. An equivalent structural or equivalent process alternation made by using the content of the specification and drawings of the present application, or an application of the content of the specification and drawings directly or indirectly to another related technical field, shall fall within the protection scope of the present application.

What is claimed is:

1. A control method for power configuration on a heterogeneous network, comprising:
   increasing, by a user equipment, power of a dedicated physical control channel between uplink and downlink balance points when the user equipment is in a soft handover area in which a macro base station is used as a serving base station; and
   adjusting a power offset of an enhanced dedicated physical data channel to a first power offset $PO_1$, wherein the first power equals $(SIR_0/SIR_1)\times(PO_0+PO_w)-PO_w$, wherein $SIR_0$ is an initial signal-to-noise ratio target value of the dedicated physical control channel when the user equipment is not in the soft handover area, $SIR_1$ is an adjusted first signal-to-noise ratio target value of the dedicated physical control channel when the user equipment is in the soft handover area, $PO_0$ is an initial power offset of the enhanced dedicated physical data channel when the user equipment is not in the soft handover area, and wherein $PO_w$ is the sum of power offsets of a high speed dedicated physical control channel, an enhanced dedicated physical control channel, a dedicated physical data channel, and the dedicated physical control channel when the user equipment is not in the soft handover area.

2. The method according to claim 1, wherein the increasing comprises: adjusting a signal-to-noise ratio target value of the dedicated physical control channel from the initial signal-to-noise ratio target value to the first signal-to-noise ratio target value, wherein the first signal-to-noise ratio target value is greater than the initial signal-to-noise ratio target value.

3. The method according to claim 1 wherein the increasing comprises: adjusting transmit power of the dedicated physical control channel from the initial transmit power to the first transmit power, wherein the first transmit power is greater than the initial transmit power.

4. A user equipment, comprising:
a processor; a transmitter; and a receiver,
wherein the processor is electrically coupled to the transmitter and the receiver and is configured to:
increase power of a dedicated physical control channel between uplink and downlink balance points, when the user equipment is in a soft handover area, in which a macro base station is used as a serving base station, and
adjust a power offset of an enhanced dedicated physical data channel to a first power offset $PO_1$, wherein the first power equals $(SIR_0/SIR_1) \times (PO_0 + PO_w) - PO_w$,
wherein the transmitter is configured to send a communication signal to a base station, and
wherein the receiver is configured to receive a communication signal from the base station;
wherein $SIR_0$ is an initial signal-to-noise ratio target value of the dedicated physical control channel when the user equipment is not in the soft handover area, $SIR_1$ is an adjusted first signal-to-noise ratio target value of the dedicated physical control channel when the user equipment is in the soft handover area, $PO_0$ is an initial power offset of the enhanced dedicated physical data channel when the user equipment is not in the soft handover area, and wherein $PO_w$ is the sum of a power offsets of a high speed dedicated physical control channel, an enhanced dedicated physical control channel, a dedicated physical data channel, and the dedicated physical control channel when the user equipment is not in the soft handover area.

5. The user equipment according to claim 4, wherein
the processor is further configured to: adjust a signal-to-noise ratio target value of the dedicated physical control channel from the initial signal-to-noise ratio target value to the first signal-to-noise ratio target value, wherein the first signal-to-noise ratio target value is greater than the initial signal-to-noise ratio target value.

6. A user equipment comprising:
a processor; a transmitter; and a receiver,
wherein the processor is electrically coupled to the transmitter and the receiver and is configured to:
increase power of a dedicated physical control channel between uplink and downlink balance points, when the user equipment is in a soft handover area, in which a macro base station is used as a serving base station, and
adjust a power offset of an enhanced dedicated physical data channel to a first power offset $PO_1$, wherein the first power offset equals $(Ec_{dpcch0}/Ec_{dpcch1}) \times (PO_0 + PO_w) - PO_w$,
wherein the transmitter is configured to send a communication signal to a base station, and the receiver is configured to receive a communication signal from the base station,
wherein $Ec_{dpcch0}$ is initial transmit power of the dedicated physical control channel when the user equipment is not in the soft handover area, $Ec_{dpcch1}$ is adjusted first transmit power of the dedicated physical control channel when the user equipment is in the soft handover area, $PO_0$ is an initial power offset of the enhanced dedicated physical data channel when the user equipment is not in the soft handover area, and
wherein $PO_w$ is the sum of a power offsets of a high speed dedicated physical control channel, an enhanced dedicated physical control channel, a dedicated physical data channel, and the dedicated physical control channel when the user equipment is not in the soft handover area.

7. The user equipment according to claim 6, wherein
the processor is further configured to: adjust transmit power of the dedicated physical control channel from the initial transmit power to the first transmit power, wherein the first transmit power is greater than the initial transmit power.

* * * * *